US008457769B2

(12) United States Patent
Merrill

(10) Patent No.: US 8,457,769 B2
(45) Date of Patent: Jun. 4, 2013

(54) INTERACTIVE AUDIO RECORDING AND MANIPULATION SYSTEM

(75) Inventor: David Merrill, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1321 days.

(21) Appl. No.: 11/969,170

(22) Filed: Jan. 3, 2008

(65) Prior Publication Data

US 2008/0167740 A1 Jul. 10, 2008

Related U.S. Application Data

(60) Provisional application No. 60/878,772, filed on Jan. 5, 2007.

(51) Int. Cl.
*G06F 17/00* (2006.01)

(52) U.S. Cl.
USPC ........................................................... 700/94

(58) Field of Classification Search
USPC .... 700/94; 704/500-504; 369/1-12; 381/119
See application file for complete search history.

(56) References Cited

U.S. PATENT DOCUMENTS 7,133,531 B2 * 11/2006 Karpenstein .................. 381/119
7,526,348 B1 * 4/2009 Marshall et al. ................ 700/94
7,590,460 B2 * 9/2009 Nishioka et al. ................ 700/94
7,756,595 B2 * 7/2010 Asada et al. .................... 700/94
2002/0103919 A1 * 8/2002 Hannaway .................... 709/231
2003/0035559 A1 * 2/2003 Cohen ........................... 381/119
2003/0212466 A1 * 11/2003 Alferness ........................ 700/94

OTHER PUBLICATIONS

Oxford English Dictionary definition of Cyclic; retrireved Oct. 4, 2011.*

Schmierer, Brian. "USB Gamepad Music Controller," MAKE, vol. 15, available: http://www.make-digital.com/make/vol16/templates/pageviewer_prir, printed Sep. 15, 2008, © 2005, pp. 2,74-77.

* cited by examiner

*Primary Examiner* — Andrew C Flanders
(74) *Attorney, Agent, or Firm* — SoCal IP Law Group LLP; John E. Gunther; Steven C. Sereboff

(57) ABSTRACT

A system for interactive audio recording and manipulation may include a controller having at least one two-axis analog control and plurality of control buttons. The controller may be coupled to a computing device including a processor, a memory, and an audio interface including at least one audio input port to accept an input audio signal and at least one audio output port to provide an output audio signal. The system may perform actions in response to inputs from the controller. The actions may include recording the audio input signal as a recorded track, playing the recorded track to provide an audio output signal, scrubbing the recorded track in response to activation of the two-axis analog control along a first axis, and pitch-shifting one of the input audio signal and the output audio signal in response to activation of the two axis analog control along a second axis.

21 Claims, 7 Drawing Sheets

* Pitch Enable and Scrub Enable are optional depending on the type of 2-axis analog control.
** Up, Down, Left, and Right are analog functions having both a direction and magnitude of motion.

INTERACTIVE AUDIO RECORDING AND MANIPULATION SYSTEM

RELATED APPLICATION INFORMATION

This patent claims priority under 35 USC 119(e) from Provisional Patent Application Ser. No. 60/878,772, entitled INTERACTIVE AUDIO RECORDING AND MANIPULATION SYSTEM, filed Jan. 5, 2007.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to systems for recording and manipulating music and other audio content.

2. Description of the Related Art

Music creation and performance are activities enjoyed by people in every country of the world. Acoustic instruments have evolved over thousands of years, and their earliest electronic counterparts emerged nearly 100 years ago. The past decade has seen perhaps the most dramatic changes in how people produce music electronically, both individually and in groups. Digital samplers and synthesizers, computer-based recording and sequencing software and advances in new control interfaces have all pushed musical activities forward, with some interesting practices emerging.

One interesting practice is sequenced digital sample composition. Entire songs or backing tracks are now created from pre-recorded digital samples, stitched together in graphical software applications like Apple's Garage Band or Abelton's Live. This composition process usually involves a great degree of initial setup work, including finding samples, composing a piece, and scheduling the samples in the desired sequence. Some software programs allow for live performance and improvisation, using control surfaces with knobs, faders and buttons, or MIDI instruments to trigger the samples and to apply effects. A laptop computer is often brought to concerts to support live performance with these interfaces. A problem that has been often-discussed in electronic music circles is the "laptop musician problem," which is that the computer-as-musical interface leaves much to be desired from the audience's point of view. A "performer" on stage interacting directly with a laptop computer, focused on the screen and using a mouse and keyboard, is typically not capable of giving an expressive bodily performance. Rather, the audience sees them looking at the screen and hardly moving their bodies, giving few clues as to the connection between their physical actions and the sounds being produced. It has often been cynically observed that these performers may be checking their email rather than actively creating the sounds coming from their computers.

A second practice that has enjoyed great popularity in recent years is the phenomenon of music-based video games. Guitar Hero and its sequel have been perhaps the most successful musical video games to date, but there are a number of other examples. The important characteristics of these games for the present discussion is that they use game-oriented controllers. Some games, like Guitar Hero, use special controllers made expressly for the purposes of the game. However, these games may not allow for music creation ad manipulation. Rather, they tend to enable musical "script-following," in which gamers must press buttons in rhythm with pre-composed music or sing along with a pre-created song (i.e. karaoke). Games that allow for sequencing of samples do not permit on-the-fly recording of new samples by the musician, or continuous effects such as pitch-shifting and scrubbing.

DETAILED DESCRIPTION

Description of Apparatus

Figure 1:
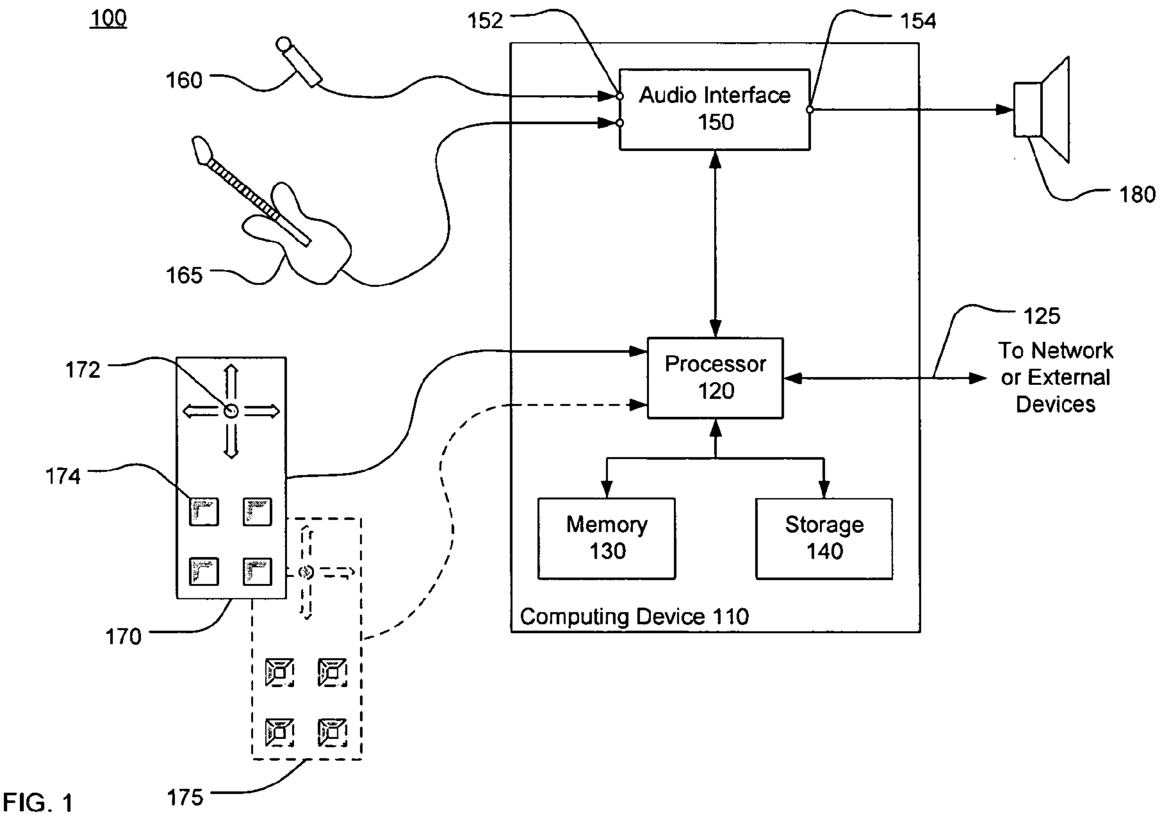
FIG. 1 is a block diagram of an interactive audio recording and manipulation system.

Referring now to FIG. 1, an interactive audio recording and manipulation system 100 may incorporate a controller 170, which may be hand-held, interfaced to custom audio processing and control software running on a computing device 110. The use of a hand-held controller for the controller 170 may make the interactive audio recording and manipulation system a playful interface for manipulation of on-the-fly recorded sound, approachable to users of different skill levels. Behind the approachability however, may be the capability to flexibly record, sequence and manipulate any digital sound. The interactive audio recording and manipulation system may be used as a real musical instrument capable of true musical creation, rather than just the simpler "script-following" behavior featured by existing musical video games.

The interactive audio recording and manipulation system 100 may include additional controllers, such as controller 175, to allow two or more musicians to compose and/or perform as an ensemble. Two or more controllers 170/175 may be coupled to a common computing device 110, as shown in FIG. 1, or may be coupled to a plurality of computing devices linked through an interface 125 to a network.

The computing device 110 may be any device with a processor 120, memory 130 and a storage device 140 that may execute instructions including, but not limited to, personal computers, server computers, computing tablets, set top boxes, video game systems, personal video recorders, telephones, personal digital assistants (PDAs), portable computers, and laptop computers. The computing device 110 may have a wired or wireless interface to the controller 170. The computing device may be physically separate from the controller 170, or may be integrated with or within the controller 170. The coupling between the computing device 110 and the controller 170 may be wired, wireless, or a combination of wired and wireless. The computing device 110 may include software, hardware and firmware for providing the functionality and features described here.

The computing device 110 may have at least one interface 125 to couple to a network or to external devices. The interface 125 may be wired, wireless, or a combination thereof. The interface 125 may couple to a network which may be the Internet, a local area network, a wide area network, or any other network including a network comprising one or more additional interactive audio recording and manipulation systems. The interface 125 may couple to an external device which may be a printer an external storage device, or one or more additional interactive audio recording and manipulation systems.

The computing device 110 may include an audio interface unit 150. The audio interface unit 150 may have at least one audio input port 152 to accept input audio signals from external sources, such as microphone 160 and electronic instrument 165, and at least one audio output port 154 to provide output audio signals to one or more audio output devices such a speaker 180. The audio interface unit 150 may have a plurality of audio output ports to provide audio signals to a plurality of audio output devices which may include multiple speakers and/or headphones. The audio input and output ports may be wired to the audio sources and audio output devices. The audio input and output ports may be wireless, and may receive and transmit audio signals using a wireless infrared or RF communication protocol, which may include Bluetooth, Wi-Fi, or another wireless communication protocol.

The computing device 110 and the audio interface unit 150 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The computing device 110 may run an operating system, including, for example, variations of the Linux, Unix, MS-DOS, Microsoft Windows, Palm OS, Solaris, Symbian, and Apple Mac OS X operating systems. The processes, functionality and features may be embodied in whole or in part in software which operates on the computing device and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the computing device 110 and other components are performed by the controller 170 or by other devices.

The storage device 140 may be any device that allows for reading and/or writing to a storage medium. Storage devices include, hard disk drives, DVD drives, flash memory devices, and others. The storage device 140 may include a storage media to store instructions that, when executed, cause the computing device to perform the processes and functions described herein. These storage media include, for example, magnetic media such as hard disks, floppy disks and tape; optical media such as compact disks (CD-ROM and CD-RW) and digital versatile disks (DVD and DVD±RW); flash memory cards; and other storage media.

The controller 170 may be any controller, such as a game controller, having a plurality of function buttons 174 and at least one continuous control 172, which may be a joystick, a thumb stick, a rotary knob, or other continuous control. The continuous control 172 may have two continuous control axis, as shown in FIG. 1. The continuous control 172 may provide analog or digital output signals proportional to the position of the control on one axis or on two orthogonal axes. The continuous control 172 may provide analog or digital output signals proportional to the force applied to the control on one axis or on two orthogonal axis. A one-axis or two-axis continuous control that provides digital output signals proportional to the rate of motion of the control, such as a mouse or trackball, may also be suitable for use in the interactive audio recording and manipulation system 100.

The controller 170 may be a single hand-held unit, as illustrated in FIG. 1. The functions and controls of the controller 170 may be divided between two or more physical units, such as separate units held in the left and right hands. Some portion of the functions and controls of the controller 170 may be hand-held and other portions may be stationary.

Figure 2:
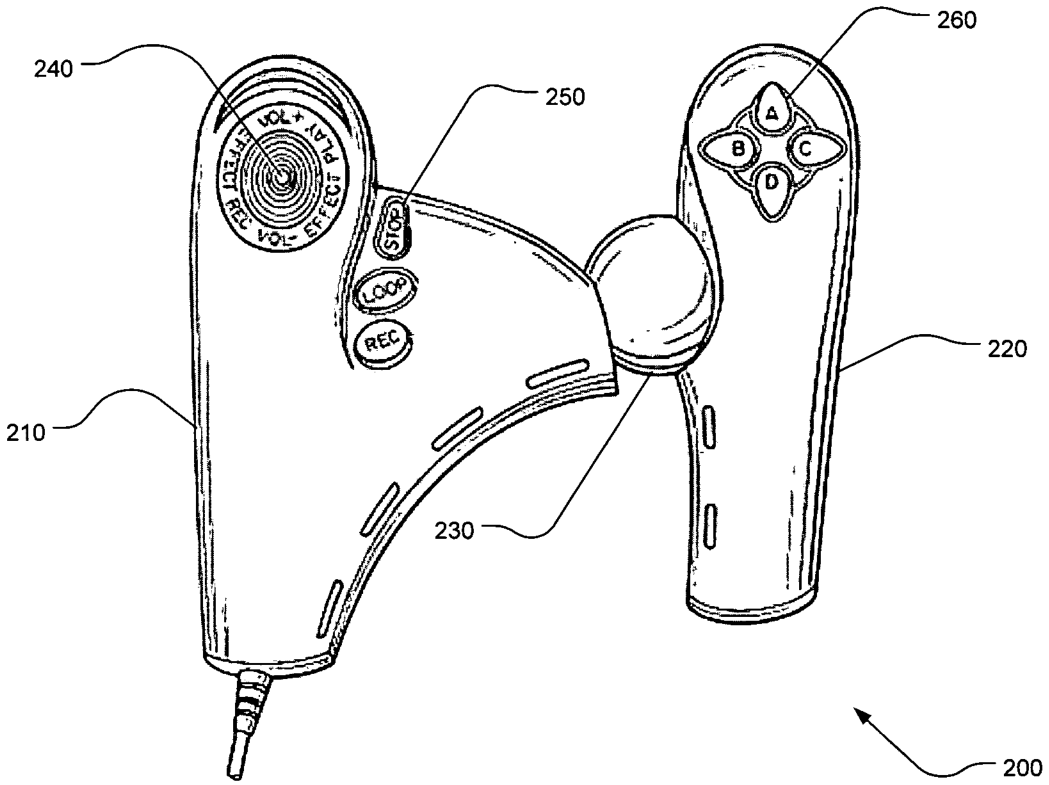
FIG. 2 is a plan view of an exemplary controller.

FIG. 2 shows a Microsoft Sidewinder Dual-Strike game controller 200 that may be suitable for use as the controller 170 in the interactive audio recording and manipulation system 100. The Sidewinder Dual-Strike game controller 200 has a left hand grip 210 and a right hand grip 220 that are joined by a two-axis rotary joint 230 that serves as a two-axis continuous control. Thus the relative position of a musician's two hands determines the continuous control output, leaving at least the musician's thumbs and index fingers available for operating function buttons.

The left hand grip 210 includes a direction-pad or D-pad 240, also called a "hat switch", that can be moved in four directions and is essentially equivalent to four function buttons. The D-pad 240 may be used to control the playback volume (VOL+/VOL−) and to control an audio effect for either recording (EFFECT REC) or playback (EFFECT PLAY). The left hand grip 210 includes three additional function buttons 250 which may be used to control REC (record), LOOP, and STOP functions that will be described in greater detail during the discussion of processes. The left hand grip 210 also includes a trigger (not visible) operated by the left index finger. The left trigger may be used to enable a pitch-shifting effect that will be described subsequently.

The right hand grip 220 includes four additional function buttons 260 which may be used to control the recording and playback of four recording tracks (A-D) as will be described in greater detail during the discussion of processes. The right hand grip 220 also includes a trigger (not visible) operated by the right index finger. The right trigger may be used to enable a scrubbing effect that will be described subsequently.

The Microsoft Sidewinder Dual-Strike game controller 200 shown in FIG. 2 is an example of a game controller suitable for use as the controller 170 in the interactive audio recording and manipulation system 100. The controller 170 may be any controller having at least one continuous control for controlling a continuous effect, at least seven function buttons or three function buttons and a direction-pad for controlling basic functions, and additional function buttons for controlling a plurality of recording tracks.

The interactive audio recording and manipulation system 100 may be playable without requiring the use of a display screen. The interactive audio recording and manipulation system 100 may be controlled exclusively through the controller 170, a property that sets the interactive audio recording and manipulation system apart from most laptop-based music-making systems. The use of the controller 170 may allow a musician's attention to be focused on giving a compelling performance, and/or interacting with other musicians. Since the musician's attention is not focused on a display screen, the musician can more easily focus on their surroundings and the musical activity, making for a more engaging, more sociable music-making experience.

Description of Processes

Figure 3:
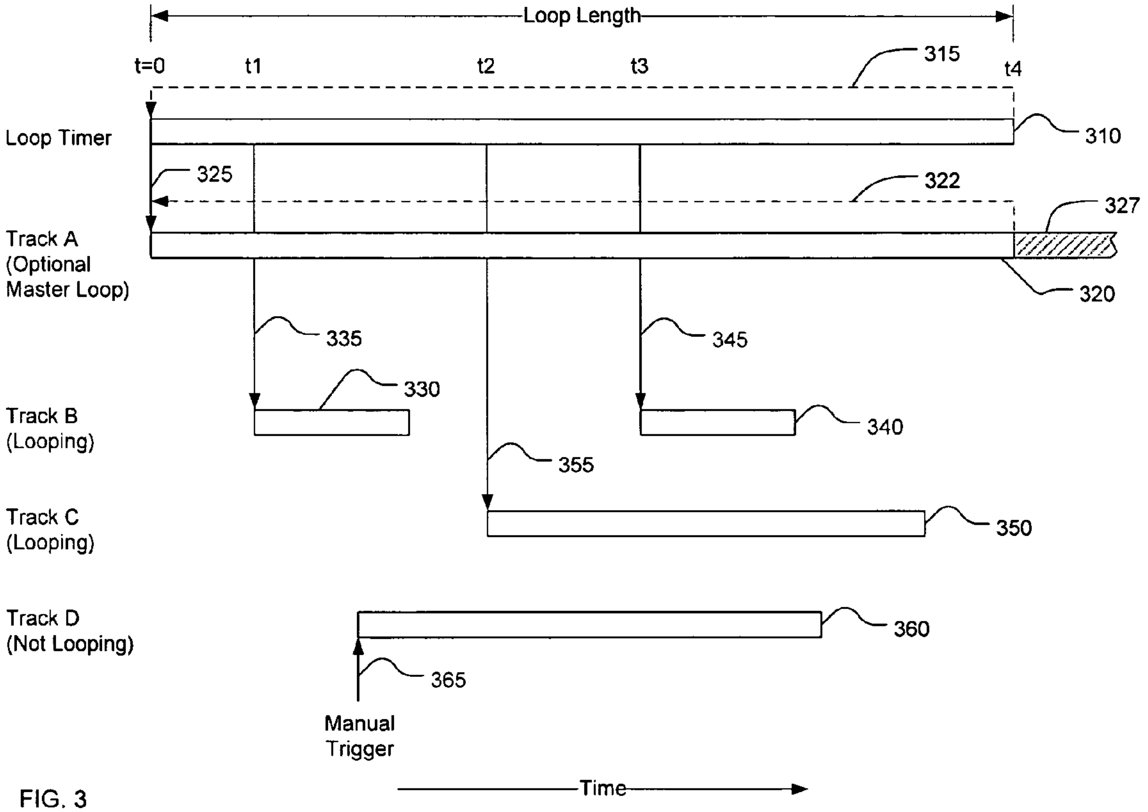
FIG. 3 is a timing diagram for an interactive audio recording and manipulation system.

FIG. 3 is an exemplary timing diagram that illustrates the concepts of looping and triggering that are fundamental to the processes that may be performed by an interactive audio recording and manipulation system, such as system 100. A plurality of recorded tracks, such as tracks A-D in the example of FIG. 3, may be stored. The stored tracks may be prerecorded, may be recorded from an audio input signal, or may be imported from another device or network. A master loop timer, indicated by bar 310, may count from zero (t=0) to a programmable time t4 which defines the loop length. Upon reaching time t4, the master loop timer 310 resets to zero, as indicated by the dashed arrow 315, and continues counting. The master loop timer 310 may be coupled to a recorded track, designated as the master loop track, which may play continuously. The master loop timer 310 may be independent of the length of any of the recorded tracks. In the example of FIG. 3, track A has been designated as the master track, as indicated by the bar 320, the master track A may start playing when the loop timer is set to t0, may continue playing until the master loop timer reaches time t4, and may restart playing from the beginning (as indicated by dashed arrow 322) when the master loop timer resets to time t0. Track A may have a recorded length that is longer than the loop length, in which case the portion of track A indicted by shaded bar 327 may not be played.

The recorded tracks other than the master loop track (i.e. tracks B, C, and D in the example of FIG. 3) may be described as secondary tracks. Since the designation of a master track is optional, all of the tracks may be operated as secondary tracks. Each secondary track may be individually set to be looping or non-looping. The playback of a track set for looping, such as tracks B and C in the example of FIG. 3, may be initiated by a trigger during each cycle of the master loop timer 310. In this context, a "trigger" is a software-initiated event that initiates the playback of a secondary track associated with the trigger. A track set to be non-looping may not start playing automatically during the master loop cycle, but playback may initiated manually at any time.

Each track set for looping, such as tracks B and C in the example of FIG. 3, will be associated with one or more triggers, where each trigger is defined, by the musician, to occur at some time between t0 and t4. For example, triggers 335 and 345 cause track B to play starting at times t1 and t3, as indicated by bars 330 and 340, during every cycle of the master loop timer 310. Similarly, a trigger 355 causes track C to play, as indicated by bar 350, starting at time t2 during every cycle of the master loop timer 310. Triggers may be used to synchronize the playing of a plurality of tracks.

A variety of techniques may be used to implement the triggers associated with the looping secondary tracks. Each trigger may be implemented as a tag attached to the master loop that initiates the playback of the associated secondary track as the master loop track is played. Each secondary track may have an associated trigger table that stores the time at which each trigger is to occur, and the playback of the secondary track may be initiated whenever the loop counter is equal to a time stored in the trigger table. The triggers for all of the secondary tracks may be stored in a common trigger table. The triggers and the master loop counter may be implemented as a set of linked data structures, or in some other manner.

Figure 4:
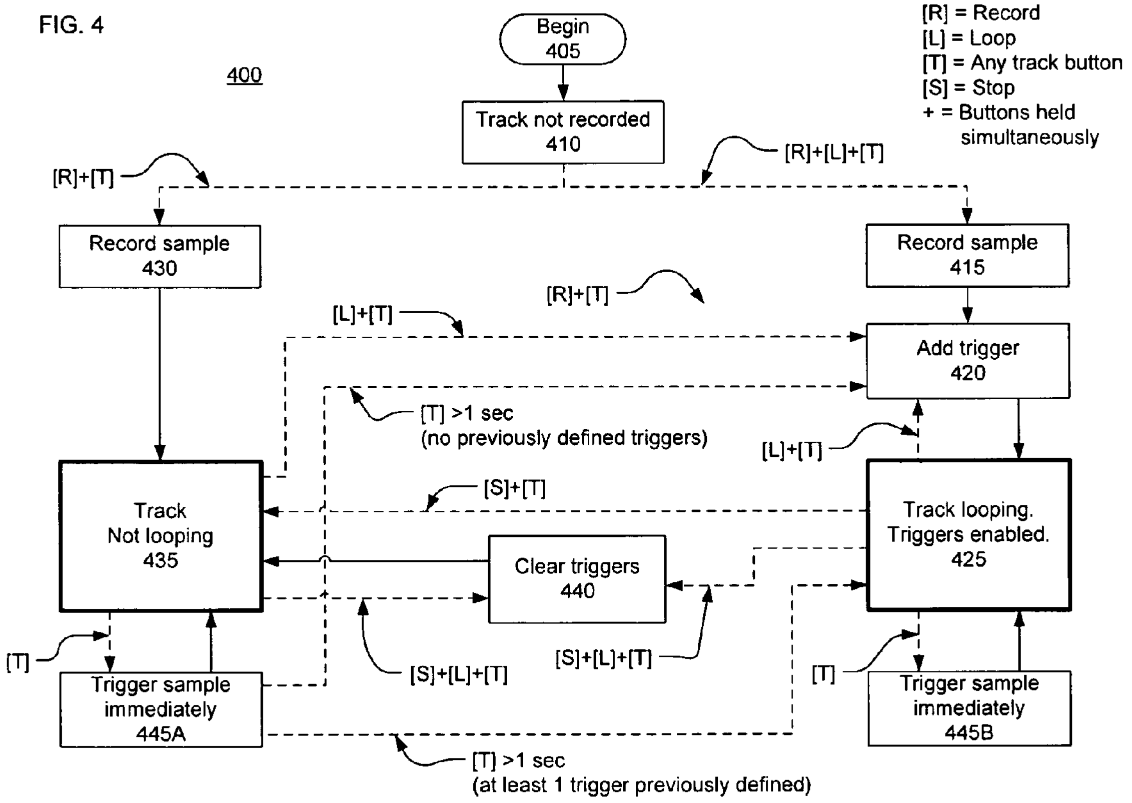
FIG. 4 is a flow chart of a process for recording and playing audio tracks.

FIG. 4 is a flow chart of exemplary portions of a process 400 for controlling an interactive audio recording and manipulation system which may be the system 100 or another audio recording and playback system. In FIG. 4 and the other flow charts in this description, a solid arrow indicates a transition between process blocks that occurs automatically. A dashed arrow indicates a transition between process blocks that occurs upon manual activation of a specific combination of function buttons on a controller. The specific combination of function buttons is indicated in FIG. 4 as a callout tied to each dashed arrow.

FIG. 4 is a flow chart of exemplary portions of a process 400 for controlling a single audio track within an interactive audio recording and manipulation system. The flow chart of FIG. 4 assumes that a master loop timer is running. The process blocks 410, 425, and 435 are stable states that can only be exited upon activation of appropriate function buttons. In stable state 410, the audio track has not been recorded (or a previously recorded track has been erased In stable state 425, the track has been recorded, has at least one trigger defined, and is looping. In stable state 435, the track has been recorded but is not looping.

At any given time, some tracks may be looping and other tracks may not be looping. The looping tracks, including the master loop track if defined, may be in stable state 425. One or more non-looping tracks may be in stable state 435, or may not be recorded.

The transition between the blocks of the process 400 may be controlled by the collective action of Record, Loop, Stop, and track function buttons which may be disposed on a controller such as game controller 200. These function buttons may be employed to record and manipulate music and other audio content as shown in brackets adjacent to the dashed transitions in FIG. 4. In general, the record button may be used in conjunction with a track button to record a sample. The loop button may be used in conjunction with a track button to switch a track to a looping state and to add triggers to a looping track. The stop button may be used in conjunction with a track button to switch a track to a non-looping state. The stop button may be used in conjunction with the loop button and a track button to clear all triggers for the designated track and to switch the track to a non-looping state. The track button may be used alone to manually trigger the playback of a track containing a recorded sample.

Figure 5:
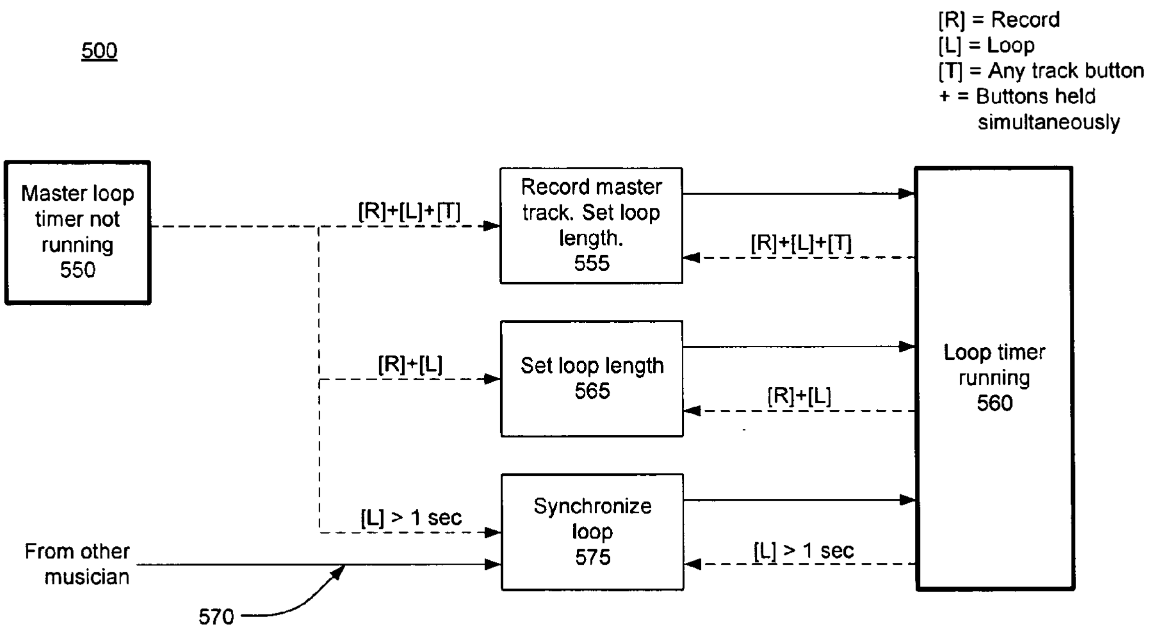
FIG. 5 is a flow chart of a process for controlling a loop timer.

FIG. 5 is a flow chart of a process for controlling a loop timer within an interactive audio recording and manipulation system. The process blocks 550 and 560 are stable states that can only be exited upon activation of appropriate function buttons. In stable state 550, which may occur only upon start-up of the interactive audio recording and manipulation system, the master loop time may not be running. In stable state 560, a master loop length may have been defined and the master loop timer may be running.

The master loop length may be defined by simultaneously activating the Record and Loop function buttons, in which case the loop length may be set to equal the duration for which both buttons were activated (565). The master loop length may be also be defined by activating the Record and Loop function buttons and a track button, in which case the loop length may be set to equal the duration for which all buttons were activated and a master track having the same length as the loop length may be recorded (555) and set into a looping state (560).

In situations where a plurality of musicians play a system for interactive audio recording an dmanipulation using a respective plurality of controllers, the master loop timer and the master loop length may be synchronized or common for the plurality of musicians. The master loop time and master loop length may be synchronizable with an external device, such as another musician (575), who may be playing a separate interactive audio recording and manipulation system. The master loop timer may be synchronized with the second musician such that the two musicians perform or record using the same master loop length. The master loop timer may be synchronized by activating the loop function button for more that a preset time period, such as one second, in which case the master loop length and current time within the master loop cycle may be loaded from the second musician or from the second interactive audio recording and manipulation system. Alternatively, two or more musicians or two or more interactive audio recording and manipulation systems may be coupled such that changing the master loop length by any musician sends a signal 570 to all other systems to synchronously change the master loop length for all musicians.

Figure 6:
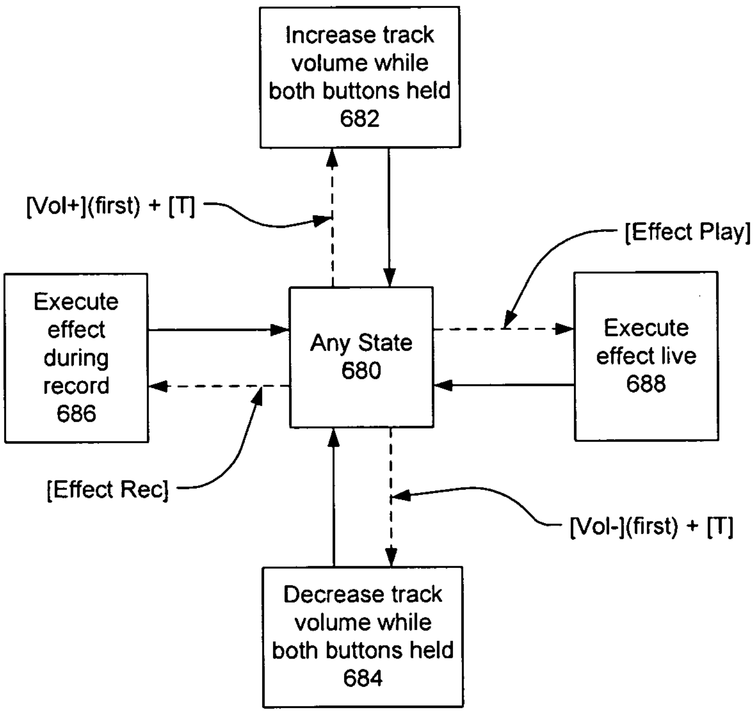
FIG. 6 is a flow chart of processes that may be controlled by a four position direction pad.

FIG. 6 is a flow chart of the processes that may be controlled by a four-position direction switch (D-switch), such as D-switch 240 in FIG. 2. With the D-switch in the center, neutral position, each recorded track may be in any state as previously described in conjunction with FIG. 4. Pressing the D-switch to the "Vol+" position (up as shown in FIG. 2) in conjunction with a track button, may increase the volume of the designated track 683. The volume of the designated track may increase gradually and progressively as long as both controls are held. The volume may increase exponentially in time (i.e. doubles every second the controls are held) to compensate for the nonlinear, approximately logarithmic, characteristics of the human ear. Note that the D-switch may need to be placed in position before the track button is pressed, since pressing the track button first may manually trigger the playback of the track. Similarly, pressing the D-switch to the "Vol−" position (down as shown in FIG. 2) in conjunction with a track button, may decrease the volume of the designated track 684.

Pressing the D-switch to the "Effect Record" position (left as shown in FIG. 2) may cause the interactive audio recording and manipulation system to execute an effect 686 as a track is being recorded 686. The effect may be reverberation or some other effect. Pressing the D-switch to the "Effect Play" position (right as shown in FIG. 2) may cause the interactive audio recording and manipulation system to execute an effect 688 on the input audio signal, such as adding reverberation to a singer's voice during a performance.

Figure 7:
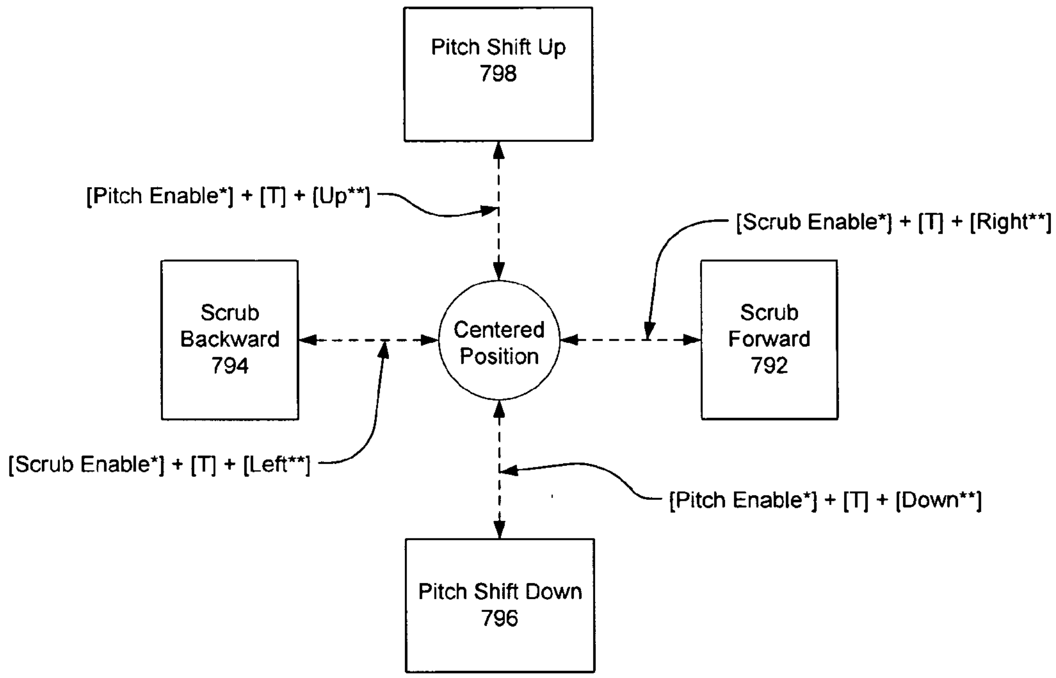
FIG. 7 is a flow chart of processes that may be controlled by a two-axis analog control.

FIG. 7 is a flow chart of exemplary processes that may be controlled by a continuous control. With the continuous control in a centered, neutral position, each recorded track may be in any state as previously described in conjunction with FIG. 4. Moving the continuous control along an axis, such as a left-right axis, may cause the interactive audio recording and manipulation system to apply and/or modulate an effect on a designated track or on an input audio signal. Effects are changes made to the audio signal in real-time, including, but not limited to, reverberation, "scrubbing", pitch-shifting, distortion, delay, or chorusing. Scrubbing and pitch-shifting will be discussed in subsequent paragraphs. Chorusing is an effect to animate the basic sound by mixing it with one or more slightly detuned copies of itself. An interactive audio recording and manipulation system, such as the system 100, may provide a library containing a plurality of effects that may be selected for use. The number of effects in use at any given time may be equal to the number of axis of continuous control available with the controller of the interactive audio recording and manipulation system.

In the example of FIG. 7, a two-axis continuous control is illustrated. In this example, left-right motion of the continuous control may be used to "scrub" a designated track 792/794. "Scrubbing" is a digital effect in which the designated track is played at a variable speed in normal or reverse time-order. The rate and direction of playback are determined by the position of the continuous control in a continuous manner. Scrubbing a track has an effect similar to the better-known "scratching" of a record by manually rotating the record under a phonograph needle. The designated track or an audio input signal may be played audibly and/or re-recorded as it is scrubbed. To avoid unintentional scrubbing sounds due to inadvertent movements of the analog control, a Scrub Enable control, such as one of the triggers on the game controller shown in FIG. 2, may be provided.

In the example of FIG. 7, moving the continuous control along a second axis, such as an up-down axis, may cause the interactive audio recording and manipulation system to shift the pitch of a designated track or an input audio signal 796/798. Pitch shifting is a digital effect in which the frequency or tone of a designated track is shifted without changing the tempo or temporal characteristics of the recorded track. For example, pitch shifting may be used to create harmony tracks. The amount and direction of the pitch shifting, or the parameters of any other effect, may be determined by the position of the continuous control. Although the motion of the continuous control may feel continuous to the musician, the amount of pitching shifting or other effect may be normalized for convenience. For example, the full travel of the continuous control may be defined as a pitch shift of one octave or two octaves. Additionally, the amount of pitch shifting may be quantized such that shifted pitches are separate by intervals that correspond to a particular musical scale, for further musical convenience. To avoid unintentional pitch shifting, or unintentional activation of any other effect, due to inadvertent movements of the analog control, a Pitch Enable/Effect Enable-control, such as a second one of the triggers on the game controller shown in FIG. 2, may be provided.

In a typical musical session with an interactive audio recording and manipulation system such as the system 100, a musician may begin by recording a percussive track or bassline, which will act as the master loop and as the "backing track" supporting the subsequent musical layering. Next, a vocal melody track may be recorded over the backing track. A harmony track to match the melody track may be recorded next. Short percussive sounds may be recorded, then sequenced at any number of desired offsets into the loop. All of these recording and layering activities utilize the buttons of the gamepad in various combinations. Finally, when this multi-layered musical creation is constructed, the musician may sing over it—sculpting their voice with pitch-shifting or reverberation. Individual samples that have been recorded may be "scratched" the way a DJ scratches a record. All of these continuous manipulations of the sound utilize the continuous degrees-of-freedom of the two-axis analog control, sometimes in conjunction with button-presses.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A system for interactive audio recording and manipulation, the system comprising:

at least one controller, each controller including at least one continuous control and a plurality of control buttons a computing device coupled to the controller, the computing device including a processor a memory coupled to the processor an audio interface coupled to the processor, the audio interface including at least one audio input port to accept an input audio signal and at least one audio output port to provide an output audio signal a storage device having instructions stored thereon which, when executed, cause the system to perform actions comprising storing a plurality of recorded tracks recording the audio input signal as a track of the plurality of recorded track in response to activation of one or more of the plurality of control buttons playing one or more of the plurality of recorded tracks to provide the audio output signal in response to activation of one or more of the plurality of control buttons defining a master loop length in response to activation of one or more of the plurality of control buttons, wherein a master loop timer counts cyclically from zero to the master loop length and then resets and repeats counting from zero applying an effect to at least one of a recorded track and the audio input signal in response to activation of the continuous control.

2. The system of claim 1, wherein the master loop length is settable independent of the length of any recorded track.

3. The system of claim 1, wherein the master loop timer is synchronizable with an external device.

4. The system of claim 1, wherein the at least one controller is a plurality of controllers controlled by a respective plurality of musicians the master loop timer is synchronized between the plurality of musicians.

5. The system of claim 1, wherein the plurality of recorded tracks includes at least one of recordings of the audio input signal, prerecorded tracks, tracks loaded through an interface to a network, and tracks loaded through an interface to another recording device.

6. The system of claim 1, wherein the playback of at least one track is initiated by at least one trigger during each cycle of the master loop timer.

7. The system of claim 6, wherein each trigger is defined by activation of one or more of the plurality of control buttons.

8. The system of claim 6, wherein the controller includes three primary function buttons and a plurality of track select buttons activated in combination to control the recording of the plurality of tracks control the playback of the plurality of tracks control the definition of the master loop length control the definition of triggers.

9. The system of claim 1, the actions performed further comprising individually adjusting the volume of each of the recorded in response to activation of one or more of the plurality of control buttons.

10. The system of claim 1 wherein the effect is selected from the group consisting of reverberation, scrubbing, pitch-shifting, delay, distortion, and chorusing.

11. The system of claim 1, further comprising a two-axis continuous control providing first and second control axis wherein the actions performed further comprise applying a first effect to at least one of a recorded track and the audio input signal in response to activation of the continuous control along the first axis applying a second effect to at least one of a recorded track and the audio input signal in response to activation of the continuous control along the second axis.

12. A non-transitory storage medium having instructions stored thereon which, when executed by a computing device coupled to a controller including a continuous control and a plurality of control buttons, will cause the computing device to perform actions comprising:

storing a plurality of recorded tracks recording an audio input signal as a track of the plurality of recorded track in response to activation of one or more of the plurality of control buttons playing one or more of the plurality of recorded tracks to provide an audio output signal in response to activation of one or more of the plurality of control buttons defining a master loop length in response to activation of one or more of the plurality of control buttons, wherein a master loop timer counts cyclically from zero to the master loop length and then resets and repeats counting from zero applying an effect to at least one of a recorded track and the audio input signal in response to activation of the continuous control.

13. The non-transitory storage medium of claim 12, wherein the master loop length is settable independent of the length of any recorded track.

14. The non-transitory storage medium of claim 12, wherein the master loop length is synchronizable with an external device.

15. The non-transitory storage medium of claim 12, wherein the computing device is coupled to a plurality of controllers controlled by a respective plurality of musicians the actions perform further comprising synchronizing the master loop timer between the plurality of musicians.

16. The non-transitory storage medium of claim 12, wherein the plurality of recorded tracks includes at least one of recordings of the audio input signal, prerecorded tracks, tracks loaded through an interface to a network, and tracks loaded through an interface to another recording device.

17. The non-transitory storage medium of claim 12, wherein the playback of at least one track is initiated by at least one trigger during each cycle of the master loop timer.

18. The non-transitory storage medium of claim 17, wherein each trigger is defined by activation of one or more of the plurality of control buttons.

19. The non-transitory storage medium of claim 12, the actions performed further comprising individually adjusting the volume of each of the recorded in response to activation of one or more of the plurality of control buttons.

20. The non-transitory storage medium of claim 12 wherein the effect is selected from the group consisting of reverberation, scrubbing, pitch-shifting, delay, distortion, and chorusing.

21. The non-transitory storage medium of claim 12, wherein the computing device is coupled to a two-axis continuous control providing first and second control axis the actions performed further comprise applying a first effect to at least one of a recorded track and the audio input signal in response to activation of the continuous control along the first axis applying a second effect to at least one of a recorded track and the audio input signal in response to activation of the continuous control along the second axis.

* * * * *